United States Patent
Yamashita et al.

(12) 
(10) Patent No.: US 6,344,236 B2
(45) Date of Patent: Feb. 5, 2002

(54) AQUEOUS DISPERSION OF A PEELABLE COATING COMPOSITION

(76) Inventors: Kenji Yamashita; Masayuki Matsuki; Hirotaka Asai; Noritsumi Matsuyama, all of c/o Rinrei Wax Co., Ltd. Research Laboratory 180, Soya, Hadano-shi, Kanagawa; Hideaki Tojo, c/o Honda Giken Kogyo Kabushiki Kaisha 1-1, Minami Aoyama 2-chome, Minato-ku, Tokyo; Hisashi Kurota, c/o Honda Giken Kogyo Kabushiki Kaisha 1-1, Minami Aoyama 2-chome, Minato-ku, Tokyo; Kensaku Akasaka, c/o Honda Giken Kogyo Kabushiki Kaisha 1-1, Minami Aoyama 2-chome, Minato-ku, Tokyo; Hideki Obara, c/o Honda Giken Kogyo Kabushiki Kaisha 1-1, Minami Aoyama 2-chome, Minato-ku, Tokyo, all of (JP)

( * ) Notice: Subject to any disclaimer, the term of this patent is extended or adjusted under 35 U.S.C. 154(b) by 11 days.

(21) Appl. No.: 09/775,776

(22) Filed: Feb. 2, 2001

Related U.S. Application Data

(62) Division of application No. 08/953,090, filed on Oct. 17, 1997, now Pat. No. 6,211,282.

(30) Foreign Application Priority Data

Apr. 23, 1996 (JP) ............................................. 8-100986

(51) Int. Cl.$^7$ .............................................. B65B 33/04

(52) U.S. Cl. ...................... 427/154; 427/155; 427/156; 427/388.4; 428/442; 428/463; 428/520; 428/522

(58) Field of Search ................................ 427/154, 155, 427/156, 338.4; 428/442, 463, 520, 522

(56) References Cited

U.S. PATENT DOCUMENTS

| 5,688,853 A | * | 11/1997 | Salter et al. ................. | 524/501 |
| 5,712,339 A | * | 1/1998 | Guerin et al. ................ | 524/501 |
| 5,712,346 A | * | 1/1998 | Lee ............................. | 524/501 |

FOREIGN PATENT DOCUMENTS

| GB | 2226324 | * | 6/1990 | ................. | 524/501 |

* cited by examiner

*Primary Examiner*—Peter Szekely

(57) ABSTRACT

The aqueous dispersion of a peelable coating composition of the present invention is (a) a mixture containing 5–40% by weight of an emulsion of an acrylic copolymer having a glass transition temperature (hereinafter referred to as "Tg") of not lower than 40° C., and 95–60% by weight of an emulsion of another acrylic copolymer having a Tg ranging from −20° C. through 5° C. The acrylic copolymer emulsion mixture (b) contains ethylenically unsaturated vinyl monomers having acid value in a total amount of 0.5–1.0% by weight, and (c) at least one of the acrylic copolymer emulsions is an acrylic copolymer which has been polymerized by use of a reactive surfactant, and (d) the particle size of the acrylic copolymer emulsions is not more than 200 nm.

6 Claims, No Drawings

AQUEOUS DISPERSION OF A PEELABLE COATING COMPOSITION

PRIOR APPLICATION

This application is a division of U.S. patent application Ser. No. 08/953,090 filed Oct. 17, 1997, now U.S. Pat. No. 6,211,282.

BACKGROUND OF THE INVENTION

1. Field of the Invention

The present invention relates to an aqueous dispersion of a peelable coating composition which is intended to be used for temporary protection of articles and is effective in temporary storage of articles during distribution, where articles may be temporarily stored in the open air or exposed to the open air during distribution.

2. Description of the Related Art

In more and more cases, articles such as automobiles and other vehicles, machine parts, metallic household articles and other ferrous and non-ferrous articles, wooden articles, glass articles, rubber articles, and coated rubber articles (hereinafter collectively referred to as "articles") reach the hands of consumers after being transported from the manufacturer and stored temporarily in the open air. In such cases, during the period before these articles are in hands of consumers (generally this period is 2–12 months in duration), the surfaces of these goods are prone to becoming scratched, stained, discolored, or contaminated due to, for example, deposits such as sandy dust, iron powder, salts, alkalis, acids, soot and smoke, dead bodies or body fluids of insects, and excrement of birds and insects; sunlight; and wind and rain. Moreover, the material may come to have marks due to physical forces.

These deposits, etc. must be removed as soon as possible, as they may reduce the value of goods. However, removal of deposits requires elaborate work, which is accompanied by additional costs.

Thus, in order to temporarily protect surfaces of an article from being damaged by the aforementioned deposits, sunlight, elements, or scratches, and to eliminate the elaborate work and accompanying costs, there have been proposed a number of strippable coating compositions which areapplied to surfaces of an article when the article is shipped, and which, after a predetermined period of custody is over, can be easily stripped off.

For example, two types of strippable coating compositions are used for outer panels of automobiles: one is a so-called oily wax type in which paraffin wax is dispersed in a petroleum-based solvent, and the other is a type in which a mixture of calcium carbonate powder in paraffin wax is dispersed in a petroleum-based solvent.

These strippable coating compositions call for use of a petroleum-based solvent for removal, and in addition, they may raise the fear of environmental problems such as air pollution. Compositions of a type in which an alkali-soluble resin is the primary component are also used, and these require an alkali detergent for removal, and therefore involve the problem of environmental pollution such as water contamination.

Acccordingly, in order to eliminate the aforementioned problems, there have been proposed emulsion-type coating compositions which form a coating film capable of being peeled off by hand after they have carried out their function of protection (see, for example, Japanese Patent Publication (kokoku) Nos. 50-39685 and 44-29583).

However, the above-described conventional coating compositions of the emulsion type have the following drawbacks.

1) The coating compositions disclosed in Japanese Patent Publication (kokoku) No. 50-39685 are made from a single starting material. Therefore, their peeling property is not satisfactory under environmental conditions in which they are usually used. For example, they cannot be satisfactorily peeled off in a wide temperature range from low temperatures around 5° C. to high temperatures around 40° C. at low temperatures the formed film breaks during the peeling operation, whereas at high temperatures it stretches and thus is not quickly peeled off.

2) Japanese Patent Publication No. 44-29593 discloses a coating composition obtained through emulsion polymerization in water of acrylonitrile and an acrylic acid ester of an lower alkyl.

Aqueous dispersions of an acrylic resin which contains acrylonitrile as an essential component raise a problem that harmful nitrogen oxides are produced during incineration of waste films that have been peeled and cause environmental pollution.

In the meantime, regarding peelable coating compositions for use with automobile outer panels, there exists need for compositions capable of forming a protective film that exerts contrasting functions simultaneously in terms of adhesion; i.e., proper adhesiveness and holding power that does not permit release of the film with ease during water-resistance tests or that never permits release during transportation of vehicles under protection by the film, and ease in peeling of the film with fingers after the period of protection by the film is over.

SUMMARY OF THE INVENTION

To solve the above-described problems and meet the above-stated need, the present inventors have carried out careful studies on dispersion compositions that do not contain a nitrogen-containing vinyl monomer, and have found that an aqueous dispersion of a peelable coating composition having excellent peelability can be obtained by forming an e emulsion having the following characteristics: 1) the emulsion is an acrylic copolymer emulsion which is a mixture of two acrylic copolymer emulsions, wherein the acrylic copolymers have different predetermined glass transition temperatures, 2) the amount of ethylenically unsaturated monomers having acid value contained in the mixture is not higher than a predetermined level, and 3) the emulsion does not make use of a nitrogen-containing monomer. The present invention has been accomplished based on this finding.

Moreover, the present inventors have found that, in addition to the above-mentioned features 1) through 3), when 4) polymerization is performed under conditions in which at least one of the emulsions contains a reactive surfactant and 5) the particle size of the emulsions is controlled to fall within a predetermined range, there can be obtained an aqueous dispersion of a peelable coating composition having further improved water resistance and excellent adhesiveness, leading to completion of the present invention.

Accordingly, a first aqueous dispersion of a peelable coating composition of the present invention is characterized by comprising (a) a mixture containing 5–40% by weight of an emulsion of an acrylic copolymer having a glass transition temperature (hereinafter referred to as "Tg") of not lower than 40° C., and 95–60% by weight of an emulsion of another acrylic copolymer having a Tg ranging from −20° C. through 5° C.; wherein (b) the acrylic copolymer emulsion mixture (a) contains ethylenically unsaturated vinyl monomers having acid value in a total amount of less than 2.0% by weight; and (c) the acrylic copolymer emulsion mixture (a) contains no nitrogen-containing vinyl monomers in the form of a monomer.

A second aqueous dispersion of a peelable coating composition of the present invention is characterized by, in addition to the aforementioned requirements (a), (b), and (c), (d) at least one of the acrylic copolymer emulsions to be incorporated into the mixture is an acrylic copolymer which has been polymerized by use of a reactive surfactant, and (e) the particle size of the acrylic copolymer emulsions is not more than 200 nm.

MODES FOR CARRYING OUT THE INVENTION

Next will be described modes for carrying out the present invention.

A first mode of the present invention is drawn to the first aqueous dispersion of a peelable coating composition characterized by an acrylic copolymer emulsion having the below-described features (a) through (c). Synergism of these features afford, as demonstrated in Examples hereinbelow, not only excellent physicochemical properties including water resistance, adhesive strength, protective power, and weatherability during the period of protection, but also excellent peelability in a wide temperature range from low temperatures (about 5° C.) to high temperatures (about 40° C.) after the protection period is over, and in addition, when the after-use waste film is incinerated, the film does not generate nitrogen oxides and thus eliminates adverse effects of environmental pollution, etc.

(a) The acrylic copolymer emulsion mixture of the present invention contains 5–40% by weight of an emulsion of an acrylic copolymer having a glass transition temperature of not lower than 40° C. and 95–60% by weight of an emulsion of another acrylic copolymer having a Tg ranging from −20° C. through 5° C.

(b) The acrylic copolymer emulsion mixture (a) contains ethylenically unsaturated vinyl monomers having acid value in a total amount of less than 2.0% by weight.

(c) The acrylic copolymer emulsion mixture (a) contains no nitrogen source such as acrylonitrile in the form of a monomer.

A second mode of the present invention is drawn to the second aqueous dispersion of a peelable coating composition of the present invention characterized by, in addition to the aforementioned requirements (a), (b), and (c), the following features (d) and (e). synergism of all these features afford, as demonstrated in Examples hereinbelow, excellent physicochemical properties including water resistance, adhesive strength, and so on.

(d) At least one of the acrylic copolymer emulsions to be incorporated into the mixture is an acrylic copolymer which has been polymerized by use of a reactive surfactant.

(e) The particle size of the acrylic copolymer emulsions is not more than 200 nm.

Examples of the acrylic copolymer emulsion of the present invention include, but are not limited to, copolymer emulsions of one or more acrylic acid alkyl esters and/or methacrylic acid alkyl esters and one or more vinyl monomers which are capable of being polymerized with the acrylic alkyl esters and/or methacrylic alkyl esters, wherein the vinyl monomers include vinyl acetate, hydroxyl-group-containing vinyl monomers such as hydroxyethyl acrylate, hydroxyethyl methacrylate,. hydroxypropyl acrylate, hydroxypropyl methacrylate, and allyl alcohol, epoxy-group-containing vinyl monomers such as glycidyl acrylate and glycidyl methacrylate, and aromatic vinyl monomers such as styrene, methylstyrene, dimethylstyrene, ethylstyrene, butylstyrene, and benzylstyrene; and copolymer emulsions of a carboxyl-group-containing vinyl monomer such as acrylic acid, methacrylic acid, itaconic acid, citraconic acid, and crotonic acid and the aforementioned one or more vinyl monomers which are capable of being polymerized with the acrylic alkyl esters and/or methacrylic alkyl esters.

It should, however, be noted that nitrogen-containing monomers including acrylonitrile, aminoalkyl acrylates such as diethylaminoethyl acrylate and aminodimethyl acrylate, cyanoethyl acrylate, and isocyanate adducts are excluded from constituent monomers of the aforementioned acrylic copolymer emulsions.

With this exclusion, the waste coating film does not generate nitrogen oxides when incinerated, thus eliminating the fear of environmental pollution.

According to the present invention, two acrylic copolymer emulsions having different Tg ranges are mixed. Specifically, the Tg range of a first acrylic copolymer is equal to or greater than 40° C., and that of a second acrylic copolymer is from −20° C. to 5° C.

The proportions of these two emulsions are preferably such that the acrylic copolymer emulsion having a Tg of not lower than 40° C. is between 5% by weight and 40% by weight inclusive and the acrylic copolymer emulsion having a Tg from −20° C. to 5° C. is between 95% by weight and 60% by weight inclusive.

More preferably, the proportions of these two emulsions are such that the acrylic copolymer emulsion having a Tg of not lower than 40° C. is between 10% by weight and 35% by weight inclusive and the acrylic copolymer emulsion having a Tg from −20° C. to 5° C. is between 90% by weight and 65% by weight inclusive.

Also, the proportion of the ethylenically unsaturated vinyl monomers having acid value in the acrylic copolymer emulsion mixture system is not more than 2.0% by weight, more preferably 0.2–0.8% by weight, with respect to the weight of the entirety of the mixture.

If ethylenically unsaturated vinyl monomers having acid value are contained in amounts in excess of 2.0% by weight, water resistance of the resultant coating film becomes poor, and in addition, adhesive strength increases to render the film excessively heat- and weather- resistant and therefore the film may not be easily peeled off, which is not preferred.

The ethylenically unsaturated vinyl monomers having acid value may be—among those which constitute the aforementioned acrylic copolymer emulsion—carboxy-containing vinyl monomers such as acrylic acid, methacrylic acid, itaconic acid, citraconicacid, and crotonic acid. However, the ethylenically unsaturated vinyl monomers having acid value are not limited only to these compounds.

In the present invention, examples of the reactive surfactants include "Aqualon RN" series (tradename, Dai-ichi Kogyo Seiyaku K.K.) which are surfactants of the polyoxy-ethylene alkylphenyl ether type in which a radical-polymerizable propenyl group has been introduced into the hydrophobic group; anionic surfactants, "Aqualon HS" series (tradename, Dai-ichi Kogyo Seiyaku K.K.) which are based on the sulfuric ester salts of "Aqualon RN"; acrylic anion surfactants, "Eleminol RS30" and "Eleminol JS-2" (tradenames, both by Sanyo Chemical Industries, Ltd.) and "Adeka Reasoap" series (trade name, Asahi Denka Kogyo K.K.).

When reactive surfactants are added upon synthesis of acrylic copolymer emulsions, water resistance of the coating film is improved, film strength is enhanced, and peelability of the film is promoted.

The particle size of the acrylic copolymer emulsions is preferably not more than 200 nm, more preferably not more than 100 nm. When the particle size is in excess of 200 nm, a sufficient contact area cannot be obtained between the composition and the surface of the object to be coated, which leads to poor water resistance.

The aforementioned mixture may incorporate, as desired, small amounts of additives which may be useful in the manufacture of peelable-coating compositions. Such additives include plasticizers (e.g., phthalate esters and fatty acid esters), wax emulsions (including polyethylene-based emulsions and polypropylene-based emulsions), defoaming agents (e.g., mineral oils and silicone oils), Rheology modifier (including inorganic type and organic type), UV absorbents (e.g., benzotriazoles and benzophenones), pH modifiers (e.g., organic alkalis and ethanolamines), preservatives (e.g., benzoisothiazolines and triazines), coalescing agents (e.g., alkyl ethers of mono- or di-ethylene glycol and alkyl ethers of mono- or di-propylene glycol), anti-freezing agents (e.g., polyhydric alcohols), peelability-improving agents (e.g., silicone emulsions and alkylphosphoric esters), drying accelerators (e.g., lower alcohols such as ethyl alcohol).

The peelable coating composition of the present invention is intended to be applied onto surfaces of articles such as automobiles and other vehicles, machine parts, metallic household articles and other ferrous and non-ferrous articles, wooden articles, glass articles, rubber articles, and coated rubber articles, to thereby protect the surfaces of the articles in the open air or indoors. Needless to say, the composition of the present invention may be used for protecting surfaces of objects other than the above articles.

Specifically, the aqueous dispersion of peelable coating composition of the present invention is advantageously used, for example, for the following purposes.

1) Prevention of stains and scratches, or degradation due to UV rays, etc. of panel coatings and resin portions of automobiles.
2) Prevention of rust stains of machine parts.
3) Prevention of stains of edible oil and dirt from hands, when applied to ventilation fans and kitchen devices and utensils,
4) Prevention of stains and scratches of aluminum fences.
5) Prevention of stains and scratches of indoor floors.
6) Protection of the wall or floor materials in a paint booth against splashing of paints.
7) Prevention of scratches, or maintenance of good appearance when applied to skis made of an FRP resin.

EXAMPLES

The present invention will next be described by way of Examples which demonstrate the effects of the invention as contrasted to Comparative Examples. However, the present invention should not be construed as being limited by the examples.

The emulsions having Tgs and particle sizes as shown in Tables 1 through 3 below were prepared, and subjected to the tests described hereinbelow.

The glass transition temperature (Tg) of each composition was measured in accordance with JIS K7121 "Testing Methods for Transition Temperatures of Plastics"

TABLE 1

1) Acrylic copolymer emulsion having a Tg of 40° C. or more

| | Tg (° C.) | Particle size (nm) | Surfactant | Ethylenically unsaturated monomer having acid value (wt %) |
|---|---|---|---|---|
| A1 | 58 | 80 | Reactive | 0.6 |
| A2 | 58 | 80 | Non-reactive | 0 |
| B1 | 46 | 75 | Reactive | 0.8 |
| B2 | 46 | 75 | Reactive | 5.0 |
| C | 46 | 250 | Reactive | 0.5 |
| D | 46 | 100 | Non-reactive | 0.1 |

TABLE 2

2) Acrylic copolymer emulsion having a Tg from −20° C. to 5° C.

| | Tg (° C.) | Particle size (nm) | Surfactant | Ethylenically unsaturated monomer having acid value (wt %) |
|---|---|---|---|---|
| F1 | 2 | 85 | Reactlve | 0.4 |
| F2 | 2 | 85 | Reactive | 0 |
| G | 2 | 300 | Reactive | 0.5 |
| H | 2 | 250 | Non-reactive | 0.7 |
| I | −15 | 80 | Reactive | 0.7 |

TABLE 3

3) Acrylic copolymer emulsion having a Tg from 5° C. to 40° C.

| | Tg (° C.) | Particle size (nm) | Surfactant | Ethylenically unsaturated monomer having acid value (wt %) |
|---|---|---|---|---|
| E | 15 | 80 | Reactive | 0.5 |

4) Method for Emulsion Polymerization

<Emulsion A1>

In a glass reactor equipped with a reflux condenser, a stirrer, a thermometer, a dropping funnel, and a gas-introduction tube were charged ammonium persulfate (1.25 parts), water (250 parts), a reactive surfactant "Aqualon RN-20" (trade name, Dai-ichi Kogyo Seiyaku K.K.) (1.8 parts), methyl methacrylate (MMA) (25 parts), butyl acrylate (BA) (23 parts), acrylic acid (AA) (2.3 parts), and t-dodecylmercaptane (0.9 parts). While the contents of the reactor were stirred, the air in the reactor was purged with nitrogen gas, and subsequently, the reactor was heated in a water bath (maintained at 60° C.).

When the temperature of the mixture in the reactor reached 60° C., a monomer mixture consisting of "Aqualon RN-20" (8.2 parts), methyl methacrylate (MMA) (112.5 parts), butyl acrylate (BA) (102 parts), acrylic acid (AA) (10.2 parts), and t-dodecylmercaptane (3.9 parts) and 2 wt. % aqueous sodium hydrogensulfite solution (32 parts) were added dropwise respectively for two hours.

After completion of addition, the system was stirred for 2 hours at 60° C.

After completion of reaction, the mixture was cooled to obtain a thermoplastic resin emulsion containing 48% solids and having a pH of 3.2.

This system was neutralized with ammonia water to thereby obtain a stable emulsion A1. The Tg of this emulsion as measured in accordance with JIS K7121 was 58° C., and the average particle size was 80 nm.

<Emulsions B1, B2, C, E, F1, F2, G, I>

In a manner similar to that employed for emulsion A1, Emulsions B1, B2, C, E, F1, F2, G, and I were prepared by changing the proportions of the monomers and changing the amounts of surfactants, to thereby obtain emulsions B1, B2, C, E, F1, F2, G, and I, having different particle sizes.

<Emulsions A2, D, and H>

In the case of emulsions A2, D, and H in which a nonreactive surfactant was used, a surfactant (trade name "Triton X-301," Rohm & Haas), an initiator, and water were charged from the first, and when the temperature of the mixture reached 60° C., a monomer mixture and a terminator were added to thereby obtain an emulsion A2, D, or H.

Through use of emulsions A1 through I, the following compositions, i.e., representatives of the present invention and the comparative examples, were obtained.

| Composition | (unit: part(s) by weight) |
|---|---|
| Emulsion D | 35 |
| Emulsion H | 63 |
| Defoaming agent | 0.4 |
| Rheology modifier | 0.1 |
| pH modifier | 1.5 |
| MFT (minimum film-forming temperature) = 12° C. | |
| Ethylenically unsaturated monomer having acid value : 0.49% by weight | |

Example 2

| Composition | (unit: part(s) by weight) |
|---|---|
| Emulsion C | 37 |
| Emulsion G | 59 |
| Defoaming agent | 0.5 |
| Rheology modifier | 0.1 |
| Peelability-improving agent | 1.0 |
| pH modifier | 1.4 |
| Coalescing agent | 1.0 |
| MFT = 5° C. | |
| Ethylenically unsaturated monomer having acid value : 0.50% by weight | |

Example 3

| Composition | (unit: part(s) by weight) |
|---|---|
| Emulsion D | 35 |
| Emulsion F | 63 |
| Defoaming agent | 0.4 |
| Rheology modifier | 0.1 |
| pH modifier | 1.5 |
| MFT = 12° C. | |
| Ethylenically unsaturated monomer having acid value : 0.16% by weight | |

Example 4

| Composition | (unit: part(s) by weight) |
|---|---|
| Emulsion A2 | 30 |
| Emulsion F2 | 67 |
| Defoaming agent | 0.5 |
| Rheology modifier | 0.1 |
| Peelability-improving agent | 1.0 |
| pH modifier | 1.4 |
| MFT = 12° C. | |
| Ethylenically unsaturated monomer having acid value 0% by weight | |

Example 5

| Composition | (unit: part(s) by weight) |
|---|---|
| Emulsion B2 | 37 |
| Emulsion F2 | 60 |
| Defoaming agent | 0.4 |
| Rheology modifier | 0.1 |
| pH modifier | 1.5 |
| Coalescing agent | 1.0 |
| MFT = 10° C. | |
| Ethylenically unsaturated monomer having acid value : 1.94% by weight | |

Example 6

| Composition | (unit: part(s) by weight) |
|---|---|
| Emulsion A | 30 |
| Emulsion I | 68 |
| Defoaming agent | 0.4 |
| Rheology modifier | 0.1 |
| pH modifier | 1.5 |
| MFT <0° C. | |
| Ethylenically unsaturated monomer having acid value : 0.67% by weight | |

Example 7

| Composition | (unit: part(s) by weight) |
|---|---|
| Emulsion B | 37 |
| Emulsion I | 60 |
| Defoaming agent | 0.5 |
| Rheology modifier | 0.1 |
| Peelability-improving agent | 1.0 |
| pH mddifier | 1.4 |
| MFT <0° C. | |
| Ethylenically unsaturated monomer having acid value : 0.74% by weight | |

Example 8

| Composition | (unit: part(s) by weight) |
|---|---|
| Emulsion B | 25 |
| Emulsion F | 73 |
| Defoaming agent | 0.4 |
| Rheology modifier | 0.1 |
| pH modifier | 1.0 |

-continued

| Composition | (unit: part(s) by weight) |
|---|---|
| Peelability-improving agent | 0.5 |
| MFT = 7° C. | |
| Ethylenically unsaturated monomer | |
| having acid value : 0.35% by weight | |

| Composition | (unit: part(s) by weight) |
|---|---|
| Emulsion D | 20 |
| Emulsion I | 77 |
| Defoaming agent | 0.5 |
| Rheology modifier | 0.1 |
| Peelability-improving agent | 1.0 |
| pH modifier | 1.4 |
| MFT <0° C. | |
| Ethylenically unsaturated monomer | |
| having acid value : 0.58% by weight | |

Comparative Example 1

| Composition | (unit: part(s) by weight) |
|---|---|
| Emulsion A | 48 |
| Emulsion F | 48 |
| Defoaming agent | 0.4 |
| Rheology modifier | 0.1 |
| pH modifier | 1.5 |
| Coalescing agent | 2.0 |
| MFT (minimum film-forming temperature) = 10° C. | |
| Ethylenically unsaturated monomer | |
| having acid value : 0.50% by weight | |

Comparative Example 2

| Composition | (unit: part(s) by weight) |
|---|---|
| Emulsion B2 | 36 |
| Emulsion F | 59 |
| Defoaming agent | 0.4 |
| Rheology modifier | 0.1 |
| pH modifier | 1.5 |
| Coalescing agent | 2.0 |
| MFT (minimum film-forming temperature) <0° C. | |
| Ethylenically unsaturated monomer | |
| having acid value : 2.34% by weight | |

Comparative Example 3

| Composition | (unit: part(s) by weight) |
|---|---|
| Emulsion E | 98 (Tg : 15° C.) |
| Defoaming agent | 0.4 |
| Rheology modifier | 0.1 |
| pH modifier | 1.5 |
| MFT (minimum film-forming temperature) = 12° C. | |
| Ethylenically unsaturated monomer | |
| having acid value : 0.5% by weight | |

Test Items and Methods

<Preparation of Test Specimens>

The specimens used in the tests were coated plates prepared as follows. Electrodeposited mild steel plates were spray-coated with an aminoalkyd resin-base paint. When the surface drys to Touch, an acrylic resin-base clear paint was sprayed, and the plates were subsequently baked at 140° C. for 20 minutes. To the resultant painted plates were applied each of the compositions prepared in the above-described Examples and Comparative Examples so as to have a film thickness of 70 μm (dry). A diversified tests were performed in terms of the below-described properties by use of the thus-prepared coated plates as test specimens.

* Peelability: Peelability of test specimens placed at 5° C., 25° C., or 40° C. was checked.

* Acid resistance: A droplet of 40% sulfuric acid aq.soln was placed on each test specimen, and the specimen was allowed to stand for 15 minutes in a 60° C. thermostatic chamber. After the specimen was cooled to room temperature, the film was peeled off, and changes of the paint were checked.

* Alkali resistance: A droplet of 0.1N sodium hydroxide aq.soln.was placed on each test specimen, and the specimen was allowed to stand for 3 hours at 70° C. After the specimen was cooled to room temperature, the film was peeled off, and changes of the paint were checked.

* Water resistance: The film-coated test specimens were soaked in 25° C. water for 24 hours, and the whitening degree was observed.

* Adhesive strength: The film-coated test specimens were soaked in 25° C. water for 24 hours, and presence or absence of natural peeling-off was observed.

* Peelability after heated: The test specimens were left in a 80° C. thermostatic chamber for 500 hours and subsequently peelability was checked at room temperature.

* Accelerated weather resistance: The test specimens were placed in an SWOM tester for 500 hours so as to accelerate degradation of the film and subsequently peelability was checked.

* Cycle test: Each test specimen was subjected to a cycle test, in which each cycle consisted of heating at 80° C. for 24 hours and subsequent cooling at 0° C. for 24 hours. After the test specimen had undergone 10 cycles, peelability of the specimen was checked.

* External exposure: The test specimens were exposed to the open air in Okinawa prefecture. When six months (including 3 months in summer) had passed, peelability of the specimen was checked.

* Combustion test: A small amount of film that had peeled off was collected and burned. Nitrogen oxides contained in the combustion gas were analyzed in accordance with JIS K0104.

The test results are shown in Table 4.

The evaluation standards were as follows:

A: Very good, B: Good, C: Poor, and D: Very poor.

TABLE 4

| | | Test Results | | | | | |
|---|---|---|---|---|---|---|---|
| | | Ex. 1 | Ex. 2 | Ex. 3 | Ex. 4 | Ex. 5 | Ex. 6 |
| A | Peelability | A | B | A | A | A | A |
| B | Acid resistance | B | A | A | A | A | A |
| C | Alkali resistance | B | A | A | A | A | A |
| D | Water resistance | B | B | B | B | A | A |
| E | Adhesive strength | B | A | B | B | A | A |
| F | Peelability after heated | A | B | A | B | A | A |
| G | Accelerated weather resistance | A | B | B | B | A | A |
| H | Cycle test | B | A | B | B | A | A |
| I | External exposure | B | A | B | B | A | A |
| J | Combustion test | A | A | A | A | A | A |
| MFT (° C.) | | 12 | 5 | 12 | 12 | 10 | <0 |
| Ethylenically unsaturated monomers having acid value | | 0.49 | 0.5 | 0.16 | 0 | 1.94 | 0.67 |
| Emulsion particle size | | 100/250 | 250/300 | 100/85 | 80/85 | 75/85 | 80/80 |
| Surfactant | | N/N | R/R | N/R | N/R | R/R | R/R |

| | | Test Results | | | | | |
|---|---|---|---|---|---|---|---|
| | | Ex. 7 | Ex. 8 | Ex. 9 | Comp. Ex. 1 | Comp. Ex 2 | Comp. Ex 3 |
| A | Peelability | A | A | A | D | D | D |
| B | Acid resistance | A | A | A | A | B | A |
| C | Alkali resistance | A | A | A | A | D | A |
| D | Water resistance | A | A | A | A | B | A |
| E | Adhesive strength | A | A | A | A | B | A |
| F | Peelability after heated | A | A | A | C | D | C |
| G | Accelerated weather resistance | A | A | A | C | D | D |
| H | Cycle test | A | A | A | D | D | C |
| I | External exposure | A | A | A | D | D | B |
| J | Combustion test | A | A | A | A | A | A |
| MFT (° C.) | | <0 | 7 | <0 | 10 | <0 | 12 |
| Ethylenically unsaturated monomers having acid value | | 0.74 | 0.35 | 0.58 | 0.5 | 2.34 | 0.5 |
| Emulsion particle size | | 75/85 | 75/85 | 100/80 | 80/85 | 75/85 | 80 |
| Surfactant | | R/R | R/R | N/R | R/R | R/R | R/R |

A: Very good
B: Good
C: Poor
D: Very poor
N: Non-reactive surfactant
R: Reactive surfactant As shown in Table 4, whereas specimens falling within the scope of the present invention were excellent with respect to all the test items, those of comparative examples were inferior to the specimens of the invention, proving the synergism achieved by the present invention.

As described hereinabove by way of examples, the aqueous dispersion of peelable coating composition of the present invention which is an acrylic copolymer emulsion exhibits excellent peelability due to the synergism of the following features: 1) The composition comprises a mixture of two acrylic copolymer emulsions, wherein the acrylic copolymers have different predetermined glass transition temperatures, 2) the amount of ethylenically unsaturated monomers having acid value in the mixture is not higher than a predetermined level, and 3) the emulsion does not make use of a nitrogen-containing monomer.

Moreover, in addition to the above-mentioned features 1) through 3), when 4) polymerization is performed under conditions in which at least one of the emulsions contains a reactive surfactant and 5) the particle size of the emulsions is controlled to fall within a predetermined range, there can be obtained, as a result of further synergism, an aqueous dispersion of a peelable coating composition having further improved water resistance, adhesiveness, and peelability.

Furthermore, since no nitrogen-containing monomers such as acrylonitrile are contained in the acrylic emulsions, when the film is peeled off after the protection period is over and the waste film is burned and disposed of, gases containing nitrogen oxides are not generated and thus there is no fear of environmental pollution.

Accordingly, the aqueous dispersion of peelable coating composition of the present invention enables to achieve protective effects superior to those obtained from previous products when used, for example, for the following purposes.

1) Prevention of stains and scratches, or degradation due to UV rays, etc. of panel coatings and resin portions of automobiles.
2) Prevention of rust stains of machine parts.
3) Prevention of stains of edible oil and dirt from hands, through application to ventilation fans and kitchen devices and utensils,
4) Prevention of stains and scratches of aluminum fences.
5) Prevention of stains and scratches of indoor floors.
6) Protection of the wall or floor materials in a paint booth against splashing of paints.
7) Prevention of scratches, or maintenance of good appearance when applied to skis made of an FRP resin.

What is claimed is:

1. A peelable film on a substrate to be protected wherein said film is made from a liquid composition consisting essentially of (a) a mixture containing 5–40% by weight of an emulsion of an acrylic copolymer having a glass transition temperature (hereinafter referred to as "Tg") of not lower than 40° C., and 95–60% by weight of an emulsion of another acrylic copolymer having a Tg ranging from −20° C. through 5° C.; wherein (b) the acrylic copolymer emulsion mixture (a) contains ethylenically unsaturated vinyl monomers having acid value in a total amount of less than 0.2–2.0% by weight; and (c) the acrylic copolymer emulsion mixture (a) contains no constituent monomers having nitrogen.

2. The peelable film of claim 1 wherein at least one of the acrylic copolymer emulsions described in (a) is an acrylic copolymer which has been polymerized by use of a reactive surfactant, and the particle size of the acrylic copolymer emulsions is not more than 200 nm.

3. The peelable film of claim 1 wherein the substrate to be protected are portions of the exterior of an automobile.

4. A method of protecting a substrate comprising applying to the substrate an aqueous dispersion consisting essentially of (a) a mixture containing 5–40% by weight of an emulsion of an acrylic copolymer having a glass transition temperature (hereinafter referred to as "Tg") of not lower than 40° C., and 95–60% by weight of an emulsion of another acrylic copolymer having a Tg ranging from −20° C. through 5° C.; wherein (b) the acrylic copolymer emulsion mixture (a) contains ethylenically unsaturated vinyl monomers having acid value in a total amount of less than 0.2–2.0% by weight; and (c) the acrylic copolymer emulsion mixture (a) contains no constituent monomers having nitrogen and drying the same to form a peelable film.

5. A method of protecting a substrate, according to claim 6, comprising applying to the substrate an aqueous dispersion wherein at least one of the acrylic copolymer emulsions described in (a) is an acrylic copolymer which has been polymerized by use of a reactive surfactant, and the particle size of the acrylic copolymer emulsions is not more than 200 nm and drying the same to form a peelable film.

6. The method of claim 4 wherein the substrate is an exterior panel of an automobile.

* * * * *